T. MAGUIRE.
AUTOMOBILE BRAKE.
APPLICATION FILED APR. 26, 1918.

1,287,065.

Patented Dec. 10, 1918.
3 SHEETS—SHEET 1.

INVENTOR
Thomas Maguire
BY
James H. Griffin
ATTORNEY

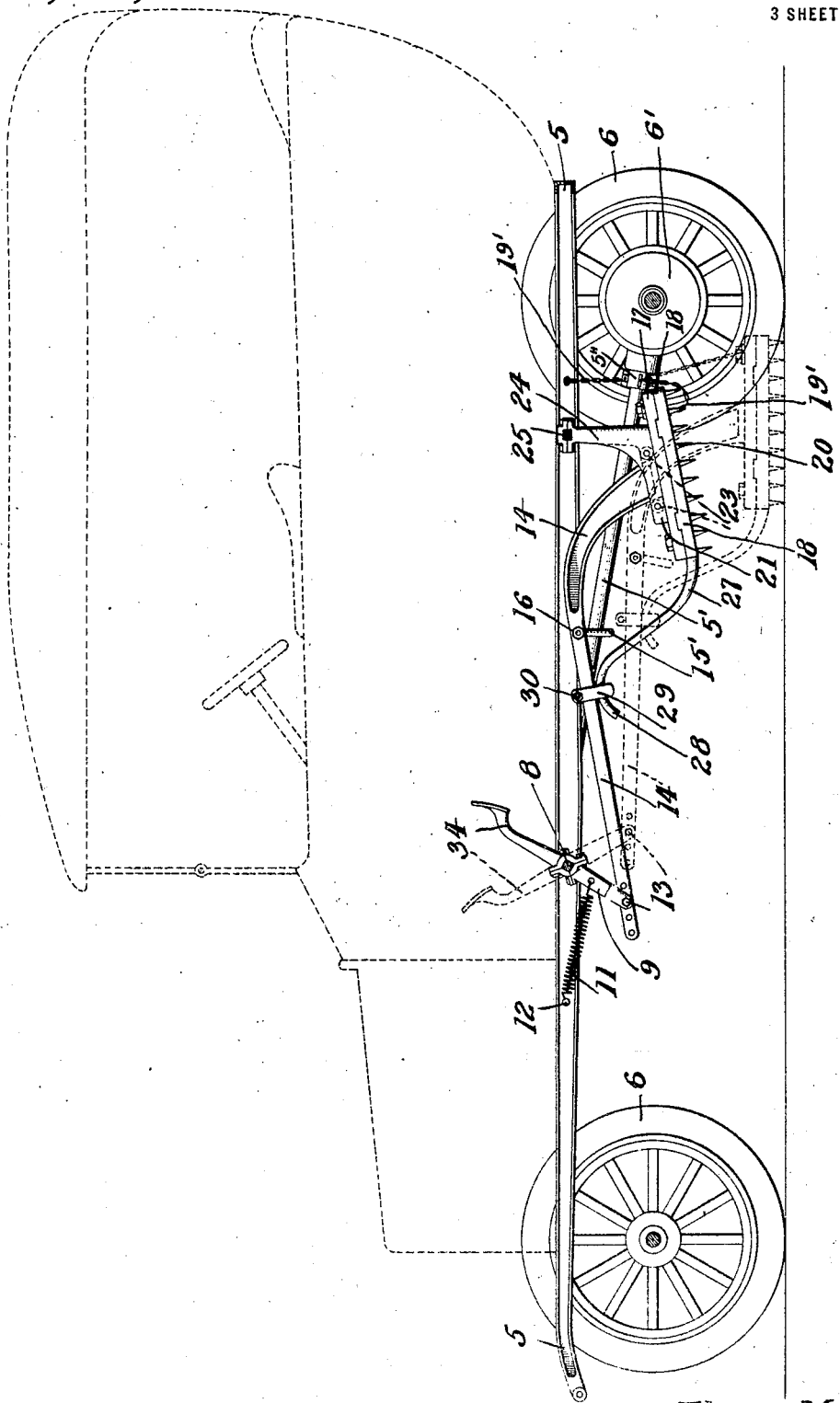

T. MAGUIRE.
AUTOMOBILE BRAKE.
APPLICATION FILED APR. 26, 1918.
1,287,065.
Patented Dec. 10, 1918.
3 SHEETS—SHEET 3.
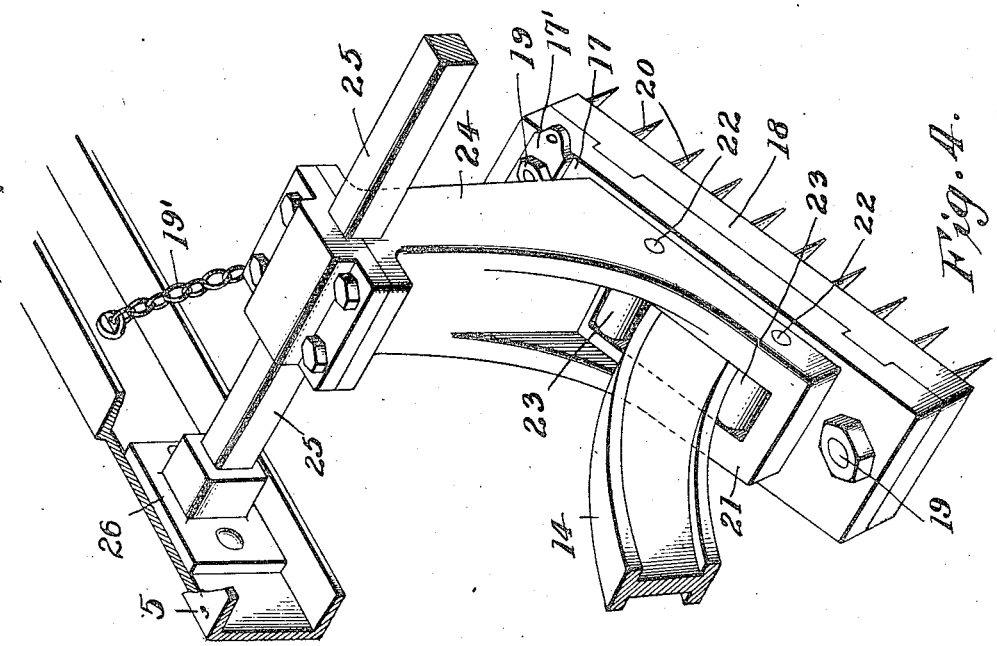
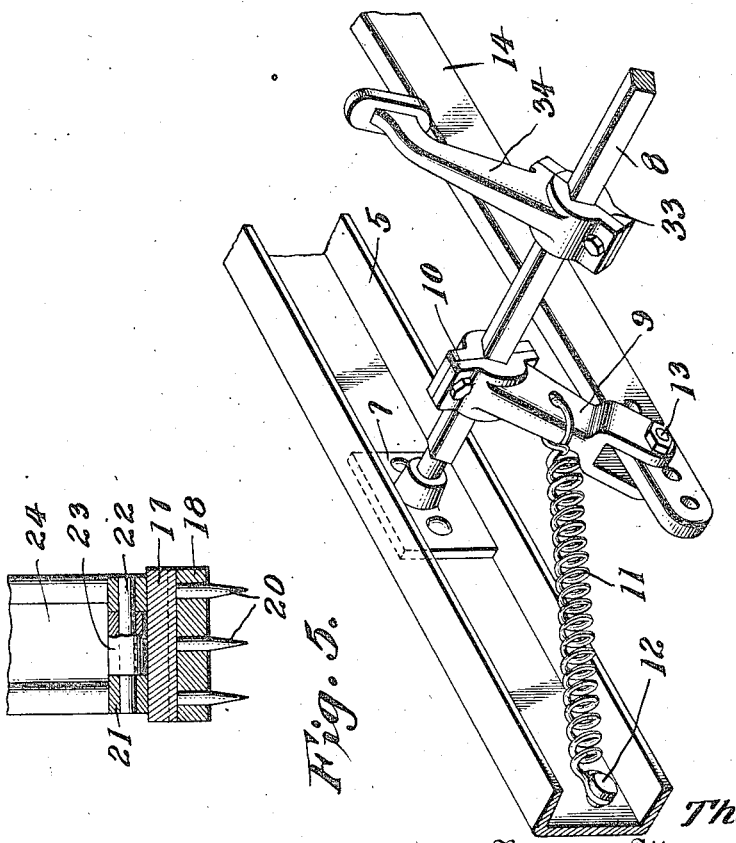
Inventor
Thomas Maguire,
By Attorney
James H. Griffin

UNITED STATES PATENT OFFICE.

THOMAS MAGUIRE, OF NEW YORK, N. Y.

AUTOMOBILE-BRAKE.

1,287,065.

Specification of Letters Patent.  Patented Dec. 10, 1918.

Application filed April 26, 1918. Serial No. 230,879.

*To all whom it may concern:*

Be it known that I, THOMAS MAGUIRE, a citizen of the United States, residing in the city of New York, borough of Queens, county of Queens, and State of New York, have invented a certain new and useful Automobile-Brake, of which the following is a specification.

This invention is an automobile brake, and embodies a special brake adapted for use in addition to the brake mechanism ordinarily employed on automobiles, the object of the invention being to enable the driver to bring the machine to a quick, decisive stop, in the event of an impending collision, or to prevent dangerous skidding.

The brake mechanism is not intended for regular use, but for employment on such emergency occasions that collisions and resulting accidents could not be avoided unless the machine was brought to a relatively abrupt stop.

Speaking generally, the invention, from a structural standpoint, and in its preferred form, embodies a shaft mounted on and extending from one side bar of the chassis to the other, two forward hangers, pivotally suspended from the shaft, two levers having their front ends pivotally connected with the hangers, two rear hangers pivotally associated with a second shaft, supported from the side bars of the chassis, a guide secured to each of said rear hangers, and a brake shoe affixed to the rear end of each of said levers and coöperating with the guides, whereby when the forward shaft is partially rotated, as by a foot pedal, the rear ends of the levers are depressed and force the brake shoes into frictional engagement with the ground. Means are provided, e. g., a spring, to automatically return the brake mechanism in its normal inoperative position, and the bottom of each brake shoe is preferably provided with spikes, which, when the brake shoes are forcibly depressed, enter the ground, thereby causing very powerful frictional engagement between the brake shoes and the ground, and almost immediately bringing the machine to a stop.

Features of the invention, other than those described, will be apparent from the hereinafter detailed description read in conjunction with the accompanying drawings and annexed claims.

The drawings illustrate one practical, and the preferred, embodiment of the invention, and which will serve to show the principle and mode of operation of the invention.

Fig. 2 is a longitudinal elevation taken through the center of the machine, showing the parts in non-operative position in full lines and in operative position in dotted lines, and the body of an auto in dotted lines;

Fig. 3 is a fragmentary view, in perspective, of a forwarding portion of the mechanism;

Fig. 4 is a fragmentary view, in perspective, of the brake and its immediately associated parts; and Fig. 5 is a cross sectional elevation taken through the brake and its shoe shown in Fig. 4.

Figure 1:
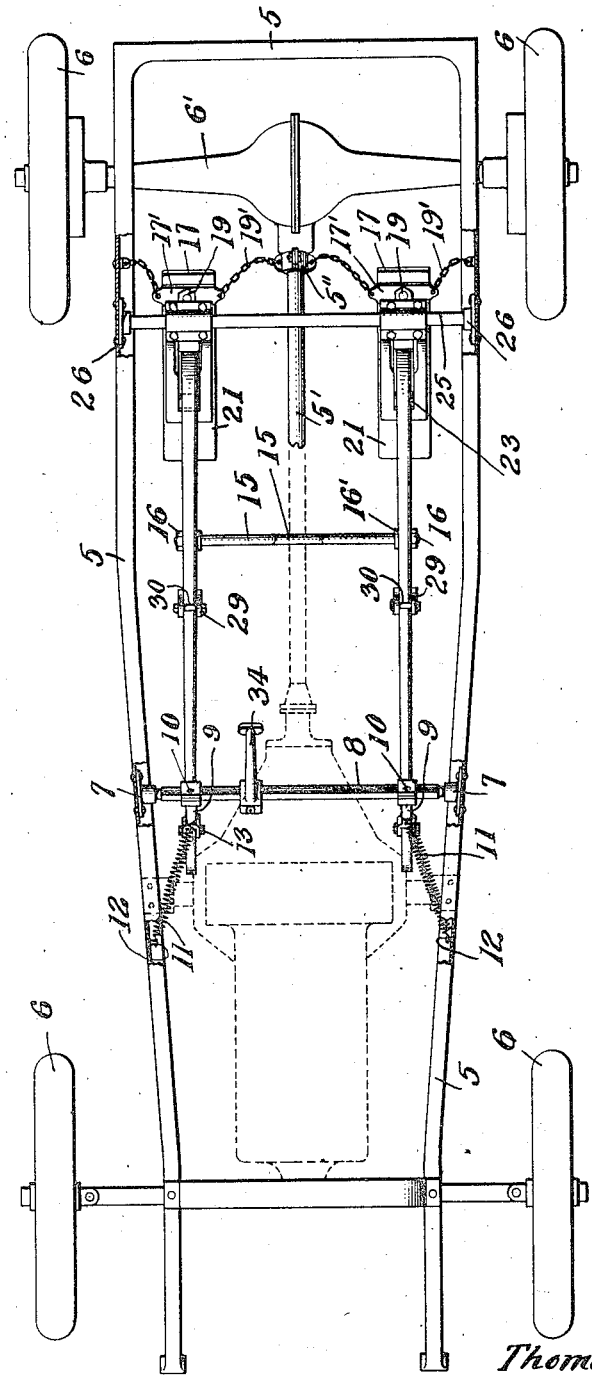
Figure 1 is a plan view, showing the invention mounted on an automobile.

The channeled side bars of the chassis are designated 5, and the wheels of the car 6. Affixed within the channels of the side bars 5, at either side and near the forward ends thereof are plates or blocks 7, in which are journaled, for partial rotation, the rounded ends of a forward, transverse shaft 8. Rigidly secured near either end of shaft 8, and depending therefrom, is a hanger 9, the upper end of which partially straddles the shaft, see Fig. 3, and is secured thereon by a complementary plate 10 bolted thereto. Any partial rotation of shaft 8, in one direction or the other, causes a corresponding movement of the hangers and their associated parts. Shaft 8 is manually operated, preferably by a foot pedal 34, hereinafter described.

The hangers 9 are held in normal, non-operative position by means of coiled springs 11, one end of each of which is secured to the hanger and the other end, by means of screws or bolts 12 to the inner face of side bars 5. Adjustably and pivotally secured near the lower ends of hangers 9, by means of bolts 13, are the forward ends of longitudinally extending levers 14. The forward end of one of the levers 14, and its associated parts, are shown in detail in Fig. 3.

Levers 14 extend toward the rear of the machine, and they are preferably provided with a tie rod 15, the ends of which may extend through the levers and be secured in position by nuts 16 and collars 16' or other suitable attaching means. The rear ends of the levers curve downwardly, see Figs. 2 and 4, and to the rear of each lever is secured a brake support or plate 17 and a brake shoe 18, secured to the support by means of bolts 19. The brake shoes are preferably provided with a plurality of downwardly projecting spikes 20, which, when the brakes are forcibly depressed enter, or tend to enter, the road bed, thereby greatly increasing the braking action.

The ends of levers 14 are guided in their downward movement by guides 21, embodying a rectangular frame in which are mounted spindles 22 on which rollers 23 are free to rotate. The end of each lever 14, in its downward and upward movements, rides on the rollers, thereby avoiding any undue friction. Each guide 21 is affixed at its rear end to a hanger or bracket 24, the upper end of which is rigidly attached to a transverse rod or bar 25, either end of which bar is secured in fixed relation to the side of the chassis by means of a plate or block 26 fixedly positioned in the channel of the side bar. Secured to the forward portion of each brake, and preferably to the shoe 18, is one end of a forwardly and upwardly extending rod or arm 27, shown in Fig. 2 in full and dotted lines, having a free end 28, which extends loosely through a bracket or guide 29, fixedly attached to lever 14 by bolt 30. Arm 27 serves as a strengthening member.

The lower end of foot pedal 34, hereinbefore referred to, partially straddles shaft 8 and is secured thereto by means of a complementary plate 33, as clearly shown in Fig. 3.

In order to preclude any undue lateral movement of the brakes relative to the chassis, a plate 17' is affixed to each brake, and associated therewith are chains 19', extending and affixed to, respectively, the sides of the chassis and to collar 5" secured on drive shaft 5' just forwardly of rear axle housing 6'.

From the foregoing description, the manner of operating the brakes will be readily understood, but it may be briefly described as follows: Springs 11, operating through hangers 9, shaft 8, and levers 14, normally retain the brakes in their elevated or non-operative positions. When, however, shaft 8 is partially rotated contra-clockwise by the driver applying pressure to the foot pedal 34, the tension of springs 11 is overcome and the hangers 9 forced rearwardly. This movement causes the levers 14 to be thrown backward and downward to the dotted positions, shown in Fig. 2, and the brake shoes are thus forcibly brought into strong frictional engagement with the road-bed.

From the foregoing description, it will clearly appear that the invention is comparatively simple in construction, efficient in operation and that it possesses pronounced utility for its intended purposes.

It will be understood that parts of the invention may be employed in other environments without necessarily employing all of the features described, and that the structure may be modified in detail, such as by the substitution of equivalents, without departing from the spirit or substance of the invention, the scope of which is commensurate with the appended claims.

Having thus fully described the invention, what I claim as new, and desire to secure by Letters Patent, is:

1. In an automobile brake, a shaft supported by the chassis and adapted to be partially rotated, means for partially rotating the shaft, hangers suspended from the shaft, levers having their forward ends pivotally connected to said hangers and having their rear ends bent downwardly, brake shoes affixed to the rear ends of said levers and means for guiding the downward movement of the levers and brake shoes.

2. In an automobile brake, a shaft adapted to be partially rotated, means for partially rotating the shaft, hangers suspended from the shaft, levers having their forward ends pivotally connected to said hangers and having their rear ends bent downwardly, brake shoes affixed to the rear ends of said levers, means for guiding the downward movement of the levers and brake shoes, and means for restoring the brake mechanism to its normal inoperative position.

3. In an automobile brake, a shaft having its ends journaled in the side bars of the chassis, and adapted to be partially rotated, means for partially rotating the shaft, hangers pivotally suspended from the shaft, levers having their forward ends pivotally connected to said hangers and having their rear ends bent downwardly, brake shoes affixed to the rear ends of said levers, means for precluding undue lateral movement of the brake shoes, a rear shaft, hangers connected with said shaft, and means associating with said hangers for guiding the downward movement of the brake shoes.

4. In an automobile brake, a shaft having its ends journaled in the sides of the chassis, means for partially rotating the shaft, levers associated with the shaft which are forced rearwardly and downwardly when the shaft is partially rotated in one direction and upwardly and forwardly when the shaft is partially rotated in the opposite direction, brakes, having their working faces provided with downwardly projecting spikes, connected with the ends of the levers, and anti-friction means for guiding the movement of the levers.

5. In an automobile brake, a shaft having its ends journaled in the sides of the chassis, means for partially rotating the shaft, levers associated with the shaft which are forced rearwardly and downwardly and over their fulcrums when the shaft is partially rotated in one direction and upwardly and forwardly over these fulcrums when the shaft is partially rotated in the opposite direction, brakes connected with the ends of the levers and tension means for retracting the brakes to their non-operative positions.

In testimony whereof I have signed my name to this specification.

THOMAS MAGUIRE.